United States Patent
Wulle et al.

(10) Patent No.: US 8,485,129 B2
(45) Date of Patent: Jul. 16, 2013

(54) TEAT RUBBER AND MILKING CUP WITH A VENTILATION NOZZLE

(75) Inventors: Manfred Wulle, Ahlen (DE); Christelle Theis, Iserlohn (DE)

(73) Assignee: GEA Farm Technologies GmbH, Boenen (DE)

( * ) Notice: Subject to any disclaimer, the term of this patent is extended or adjusted under 35 U.S.C. 154(b) by 578 days.

(21) Appl. No.: 12/310,935

(22) PCT Filed: Sep. 11, 2007

(86) PCT No.: PCT/EP2007/059519
§ 371 (c)(1),
(2), (4) Date: Jul. 16, 2010

(87) PCT Pub. No.: WO2008/031818
PCT Pub. Date: Mar. 20, 2008

(65) Prior Publication Data
US 2010/0275849 A1    Nov. 4, 2010

(30) Foreign Application Priority Data

Sep. 13, 2006 (DE) .......................... 10 2006 043 765
Mar. 27, 2007 (DE) .......................... 10 2007 014 535

(51) Int. Cl.
*A01J 5/04* (2006.01)
(52) U.S. Cl.
USPC ..................................... 119/14.47; 119/14.51
(58) Field of Classification Search
USPC ................... 119/14.47, 14.51, 14.53
See application file for complete search history.

(56) References Cited

U.S. PATENT DOCUMENTS

| 488,282 | A | | 12/1892 | Mehring |
| 1,210,468 | A | * | 1/1917 | Harner ........................ 119/14.32 |
| 1,365,665 | A | | 1/1921 | Davies |
| 2,502,362 | A | | 3/1950 | Babson et al. |
| 2,944,514 | A | | 12/1958 | Nesseth |
| 3,476,085 | A | | 11/1969 | Noorlander |
| 3,611,993 | A | | 10/1971 | Norton |
| 3,659,558 | A | | 5/1972 | Noorlander |
| 3,967,586 | A | | 7/1976 | Noorlander |
| 3,967,587 | A | | 7/1976 | Noorlander |
| 4,269,143 | A | | 5/1981 | Erbach |

(Continued)

FOREIGN PATENT DOCUMENTS

WO    WO 99/31968        7/1999
WO    WO 01/33947 A1     5/2001

OTHER PUBLICATIONS

Form PCT/IB/338, Notification of Transmittal of Translation of IPRP.

(Continued)

*Primary Examiner* — Kristen C Hayes
(74) *Attorney, Agent, or Firm* — Smith Law Office

(57) ABSTRACT

To improve the transportation away of the milk within an arrangement comprising a teat rubber and a milk hose which has a curved section, wherein the arrangement has a flow path for conducting away milked milk, which flow path is connected to the surrounding atmosphere via a channel, it is proposed that the channel is designed in such a manner that the flow direction of the air flowing through the channel into the flow path of the milk corresponds essentially to the flow direction of the milk, and the channel is formed in one of the walls of the curved section.

15 Claims, 3 Drawing Sheets

U.S. PATENT DOCUMENTS

| | | | |
|---|---|---|---|
| 4,303,038 | A | 12/1981 | Thompson |
| 4,452,177 | A | 6/1984 | Plett |
| 4,530,307 | A | 7/1985 | Thompson |
| 4,537,152 | A | 8/1985 | Thompson |
| 4,604,969 | A | 8/1986 | Larson |
| 5,161,482 | A | 11/1992 | Griffin |
| 5,178,095 | A | 1/1993 | Mein |
| 5,218,924 | A | 6/1993 | Thompson |
| 5,224,442 | A | 7/1993 | Davies |
| 5,291,853 | A | 3/1994 | Steingraber |
| 6,055,931 | A | 5/2000 | Sanford, Jr. |
| 6,308,655 | B1 * | 10/2001 | Oosterling ............... 119/14.08 |
| 7,861,669 | B2 * | 1/2011 | Alveby .................. 119/14.08 |
| 8,176,872 | B2 * | 5/2012 | Crespo .................. 119/14.36 |
| 2010/0326361 | A1 * | 12/2010 | Van Den Berg et al. ... 119/14.47 |
| 2011/0126768 | A1 | 6/2011 | Grace et al. |

OTHER PUBLICATIONS

Form PCT/IB/373, International Preliminary Report of Patentability.

Form PCT/ISA/237, Translated Written Opinion of the International Searching Authority.

Top Flow Z—das Melkzeug für alle Ziegenrassen, ProFormance, WestfaliaSurge, 4 pp.

Top Flow Z—Goat Milking Cluster (English language), ProFormance, GEA Farm Technologies—WestfaliaSurge, 4pp.

Top Flow S—das Melkzeug für Schrafrassen, ProFormance, WestfaliaSurge, 4pp.

Top Flow S—cluster for breeds of sheep (English language), ProFormance, WestfaliaSurge, 4pp.

* cited by examiner

TEAT RUBBER AND MILKING CUP WITH A VENTILATION NOZZLE

FIELD AND BACKGROUND OF THE INVENTION

The object of the invention refers to an arrangement comprising a teat rubber and a milk tube that has a curved section, to a milking cup as well as to a flow element to be used with a teat rubber or a milk tube.

Milking cups are used for the milking of animals, especially of cows, sheep and goats. A milking cup has a sleeve, in which a teat rubber is arranged. The teat rubber is the only machine part in a milking installation that comes into direct contact with the highly sensitive organ, the teat, which can be different from animal to animal. Optimal seating on the teat is required for the correct guidance and massage of the tip of the teat and thus the teat rubber has to be shaped individually for each animal.

A teat rubber is divided into the head region and shaft region. In order to be able to provide sufficient guidance of the teat, the opening in the head region must be only as large as needed, but must never be too small. As a rule, short teats do not penetrate deep enough into the teat rubber. They require a specially shaped teat rubber head. The design of the teat rubber should ensure that the teat penetrates into the region of the shaft and that massage is possible.

Different designs of milking cups are known. For example, milking cups are known which have a two-part teat rubber. Here the teat rubber is arranged within the sleeve. A short milk tube is attached to the teat rubber or to the sleeve. Moreover, it is known that the teat rubber and the short milk tube can be made as one piece. Such designs are also called monoblocks.

The teat rubbers can be made of synthetic rubber, silicone material or other materials which satisfy the requirements of compatibility with the food, the milk. Moreover, the teat rubber must have a certain elasticity in order to insure that the milking process can be performed without any adverse effect on the animal.

From the publications "Top Flow S—The Milking Machine for Sheep Species" and "Top Flow Z—The Milking Machine for all Goat Species" of the company, Westfalia-Surge, it is known that the milk tube can be connected to the teat rubber with a connection piece, whereby the connection piece is arranged essentially perpendicular to the longitudinal axis of the teat rubber. In this way a compact construction of the milking cup is achieved.

During a milking process the milked milk is transported away. For this purpose, a reduced pressure exists in the milk tube and in the teat rubber. In order to facilitate the removal of the milk, it is known from U.S. Pat. No. 6,055,931 that the flow path of the milk can be connected to the surrounding atmosphere through a channel. The aeration of the flow path has the advantage that the milked milk can be transported away rapidly, which is of special significance especially at higher milk flows.

From WO-A-01/33947 an arrangement comprising a teat rubber and a milk tube is known, that has a curved section. The arrangement has a flow path for the removal of the milked milk. The flow path is connected to the surrounding atmosphere through a channel, whereby the channel is designed so that the direction of flow of the air flowing through the channel around the flow path of the milk corresponds essentially to the direction of flow of the milk. The channel is formed by a hollow needle which is punched into the milk tube.

SUMMARY OF THE INVENTION

Based on this, the task of the present invention is to further develop the generic arrangement.

The arrangement according to the invention has a flow path for removing the milked milk. The flow part of the milk is connected to the surrounding atmosphere through a channel. The channel is preferably designed in the form of a nozzle, so that predetermined amounts of air can be directed into the flow path of the milk. In the arrangement according to the invention, the channel is designed so that the direction of flow of the air flowing through the channel into the flow path corresponds essentially to the direction flow of the milk.

The channel is formed in an essentially curved section of a teat rubber or of the milk tube. Especially preferred is hereby a design in which the channel is formed in the outside of the wall of the curved section. As appropriate, the channel can be formed on the inside of the wall of the curved section. Particularly, it is proposed that the channel be positioned in the dead zone of the curved section.

Through this design of the arrangement according to the invention, flow losses are reduced. Moreover, the flow resistance becomes smaller than in the conventional arrangements, since the air flows essentially in the direction of flow of the milk.

Moreover, such a design of the arrangement has the advantage that the flowing air essentially does not result in any destruction of the fat globule membranes in the milk. Cleavage of milk fats may occur by microbiological reaction and through lipolysis of the raw milk by the enzymes in the milk. Fatty acids are produced thereby, which has an adverse effect on the taste of the milk and in some cases on the taste of the butter or butter fat produced from the milk. The fresh raw milk already contains primary lipases. These lipases, together with secondary microbial lipases can damage the milk fat and lead to rancidity of the milk fat. This effect is increased by damaged fat globule membranes. Since such damage to the fat globule membranes is largely prevented by the design of the arrangement according to the invention, a milk of higher quality is obtained.

Especially preferred is an embodiment of the arrangement in the form in which the direction of flow of the air flowing through the channel into the flow path is essentially parallel to the direction of flow of the milk. As a result, the air does not flow against the milk, but with it, which also results in a reduction of the flow resistances.

The channel is preferably arranged in the teat rubber in such a way that it lies below a teat that is located in the teat rubber. In the case of teat rubbers designed as a monoblock, that is, in the case of teat rubbers that are joined to the milk tube, forming one piece, it is advantageous when the channel is formed in the milk tube.

Especially in the case of animals with low hanging udders or teats, the problem arises that the space between the teat and the floor may be too small. Therefore, it is proposed that the short milk tube is designed or positioned essentially perpendicular to the longitudinal direction of the teat rubber, as is described, for example, in the brochure "Top Flow" of the company, WestfaliaSurge.

The teat rubber and/or the milk tube are made of a soft elastic material. In order to ensure that the channel has a cross section that is independent of possible mechanical stresses on the teat rubber or on the milk tube, according to a still further advantageous embodiment of the teat rubber according to the invention, it is proposed that a teat rubber or a milk tube have a passage opening through which a flow element, which has an opening, at least partly extends. The flow element is preferably made of a material, or is constructed so that is has a higher degree of firmness, so that the opening has a constant cross section, independently of possible mechanical stresses on the teat rubber or on the milk tube.

According to a still further advantageous embodiment of the arrangement according to the invention, it is proposed that at least one seal be provided in the region of the passage opening. Specifically, it is proposed that the seal be designed in the form of a sealing lip. It is also possible to provide the element with a sealing lip additionally to or instead of the sealing lip in the area of the passage opening. The flow element is preferably joined to the teat rubber or to the milk tube in a positively or non-positively locking manner. The flow element and the teat rubber or the flow element and the milk tube are preferably manufactured by the multicomponent injection method. Specifically, it is proposed that the manufacture be performed according to the two-component injection method. With this measure, a simplified manufacture of the teat rubber is achieved.

An especially advantageous embodiment of the arrangement with a flow element is one that has a base body. An opening is designed in the base body. A tubular extension is joined to the base body, which is arranged essentially coaxially to the opening. At the free end of the extension, a collar is provided. The distance between the base body and the collar is preferably chosen so that the collar penetrates into the teat rubber or into the milk tube, whereby the base body lies against the wall of the teat rubber or the milk tube, respectively.

According to a still further advantageous embodiment of the arrangement according to the invention, it is proposed that the extension have at least one slit extending in the axial direction. Especially preferred hereby is an embodiment of the extension that has at least two slits, which gives the extension a certain spring-elastic property. The design of the extension with slits has the advantage that first of all, the introduction of the element into the teat rubber or milk tube is facilitated. On the other hand, the design of the extension with slits has the advantage that the cleaning is facilitated, since cleaning fluids, rinsing fluids or other fluids that are used in connection with the hygiene of the milking installation also encompass the region of the element.

According to a still further advantageous embodiment of the invention, it is proposed that the wall of the teat rubber or of the milk tube have a recess, which is designed so that it essentially corresponds to the base body. This can be achieved by having material accumulated on the wall of the teat rubber. The advantage of such a design of the teat rubber according to the invention can be seen in the fact that an essentially flat surface is obtained, so that the element cannot be pulled out of the teat rubber or the milk tube unintentionally.

Especially preferred is an embodiment in which the base body and the recess are designed to be asymmetrical, so that a defined position of the element in the teat rubber or in the milk tube is obtained, which is particularly advantageous in combination with the slotted design of the extensions.

According to a further inventive idea, a milking cup comprising a teat rubber is proposed, which has a flow path for removing the milked milk, whereby the flow path of the milk is connected to the surrounding atmosphere through a channel. The milking cup according to the invention is characterized by the fact that the channel is designed so that the channel is made in a wall of a curved section, as a result of which the air flowing into the flow path through the channel corresponds essentially to the direction of flow of the milk. Especially advantageous is an embodiment of the milking cup in which the arrangement is designed.

According to a still further inventive idea, a flow element is proposed for use with a teat rubber or milk tube, whereby the flow element comprises a base body in which a channel is formed and, joined to the base body, there is an essentially tubular extension, which is arranged essentially coaxially to the channel. In this way the possibility is created to perform aeration with the flow element. The cross section of the channel can have different sizes. Preferably it is essentially nozzle shaped. The extension has at least one slit extending in the axial direction.

According to an advantageous embodiment of the flow element, it is proposed that the extension have a collar at its free end. The extension is preferably made of a material that has a certain spring-elastic property, so that during the mounting of the flow element, the extension can be compressed. In order to simplify the mounting, according to an even further advantageous embodiment of the flow element, it is proposed that the collar have a slanting inlet.

Through the design of the teat rubber according to the invention, a reduction of the inner diameter of the teat rubber or of the milk tube is avoided.

The invention has numerous additional advantages. Further advantages and details are explained with the aid of the practical example shown in the drawings, without the object of the invention being limited to this concrete practical example.

DETAILED DESCRIPTION OF THE PREFERRED EMBODIMENTS

Figure 1:
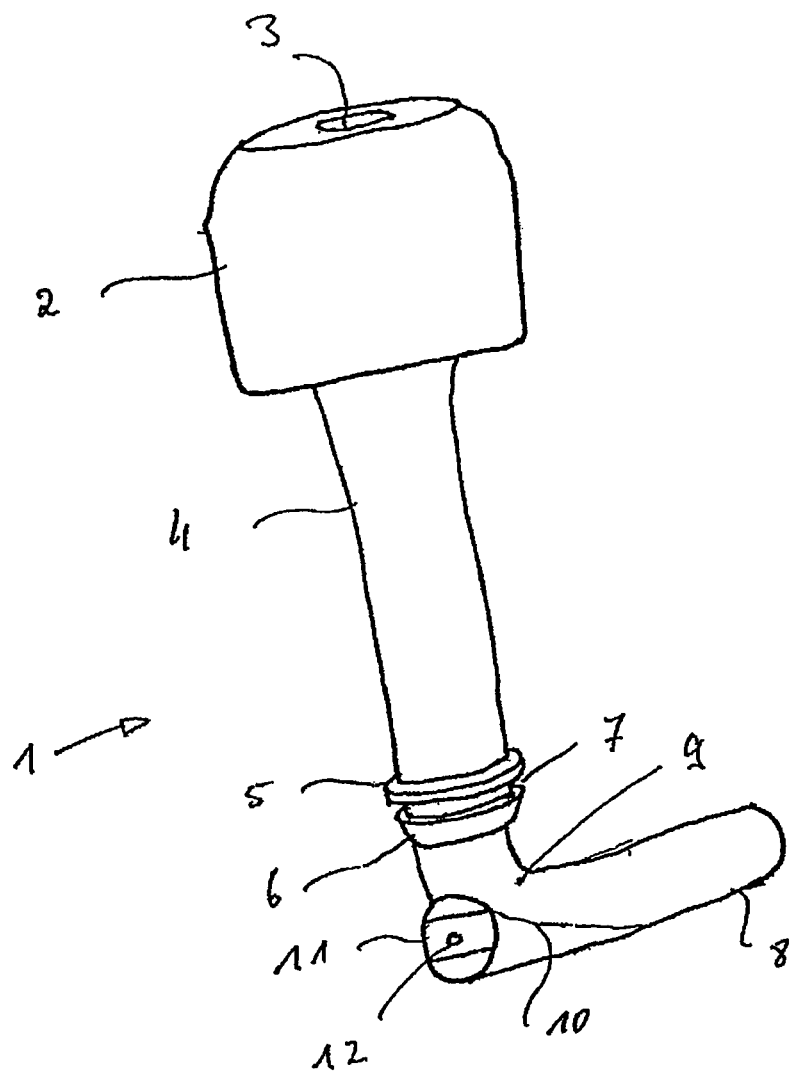
FIG. 1: schematic illustration of a practical example of a teat rubber according to the invention in a perspective view.

FIG. 1 shows schematically an arrangement according to the invention with a teat rubber 1 in a perspective view. The teat rubber 1 has a head 2. The head 2 has a teat opening 3 for the introduction of a teat into the teat rubber 1. A shaft 4 is connected to the head 2. At a distance from the head 2, the teat rubber has a first roll 5 and a second roll 6. The rolls 5, 6 border a groove 7. The sleeve as well as the other components of a milking cup are not shown. The sleeve, into which the teat rubber 1 is introduced, has an opening, the edge of which engages in the groove 7. An upper edge of the sleeve is surrounded by the head 2.

A milk tube is designated with the reference number 8. The milk tube 8 is joined to the teat rubber 1 through a curved section 9. The teat rubber 1 and the milk tube 2 are made in one piece. They form a so-called monoblock.

In the practical example shown the curved section 9 is formed in such a way that longitudinal axes of the teat rubber and of the milk tube 8 intersect at an angle of approximately 90°. This is not absolutely necessary. It is also possible for the axes to intersect at a different angle.

On the outside of the wall 10 of the curved section 9, a flow element 11 is provided, which is preferably joined to the curved section 9 with positive or non-positive locking. The flow element 11 has a channel 12. The channel 12 connects the teat rubber to the surrounding atmosphere. The channel 12 is aligned in such a way that the direction of flow of the air streaming through channel 12 into the flow path of the milk corresponds essentially to the direction of flow of the milk. In the practical example shown, the air streams through the channel 12 essentially parallel to the direction of flow of the milk. The channel 12 can be designed in a nozzle shape.

Figure 2:
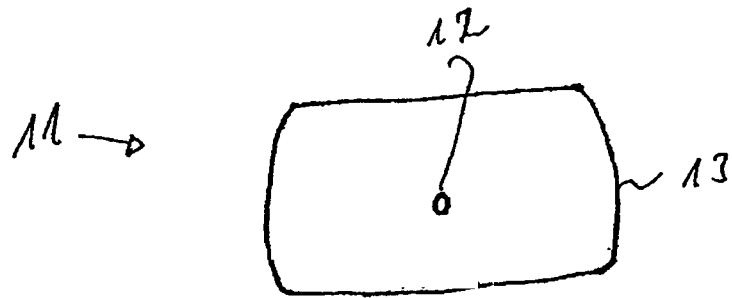
FIG. 2: an element with channel in a top view.
Figure 3:
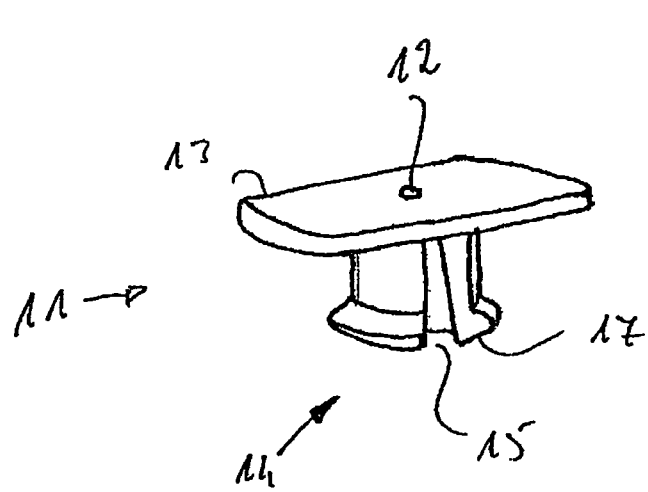
FIG. 3: the element in a perspective view from the front.
Figure 4:
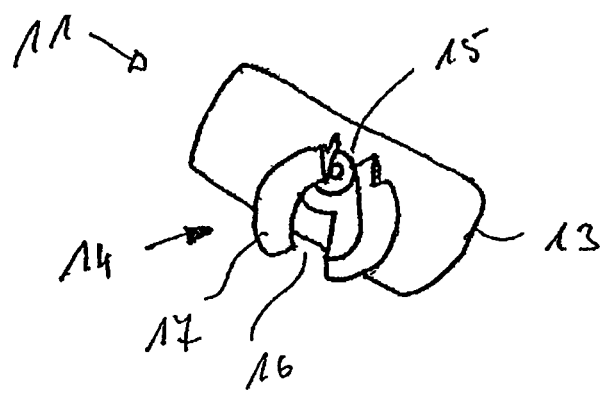
FIG. 4: the element in a perspective view from below.

Details of the flow element 11 can be seen in the preferred design as it is shown in FIGS. 2 to 4.

A seal 20 is provided in the region of the passage opening 19. With the seal 20, a preferably fluid-tight joint between the flow element 11 and the milk tube 8 is attained. The seal is designed in the form of a sealing lip, which extends in the peripheral direction of the passage opening. The sealing lip can be produced with the milk tube in one manufacturing step. It is also possible to provide a separate sealing element.

The flow element 11 has a base body 13. The base body 13 is preferably designed in the shape of a plate. Specifically, it is proposed that the base body 13 be asymmetrical. On one surface of the base body 13 and essentially vertically projecting from this, an extension 14 has a collar 17 on its free end. In the practical example shown, the collar 17 has an essentially triangular cross-sectional form, which facilitates assembly or disassembly of the element, since the surfaces of the collar 17 form slants, particularly, slanting inlets.

In the practical example shown, the extension 14 has two slits 15, 16, which extend over the entire length of the extension 14. The slits 15, 16, are arranged opposite to each other. By this design of the slits, cleaning of the flow element 11 is simplified. Moreover, the slits impart to the flow element 11 or the extension 14 a certain elasticity, so that assembly and disassembly of the flow element 11 is simplified. The extension 14 also can have more than two slits.

Figure 5:
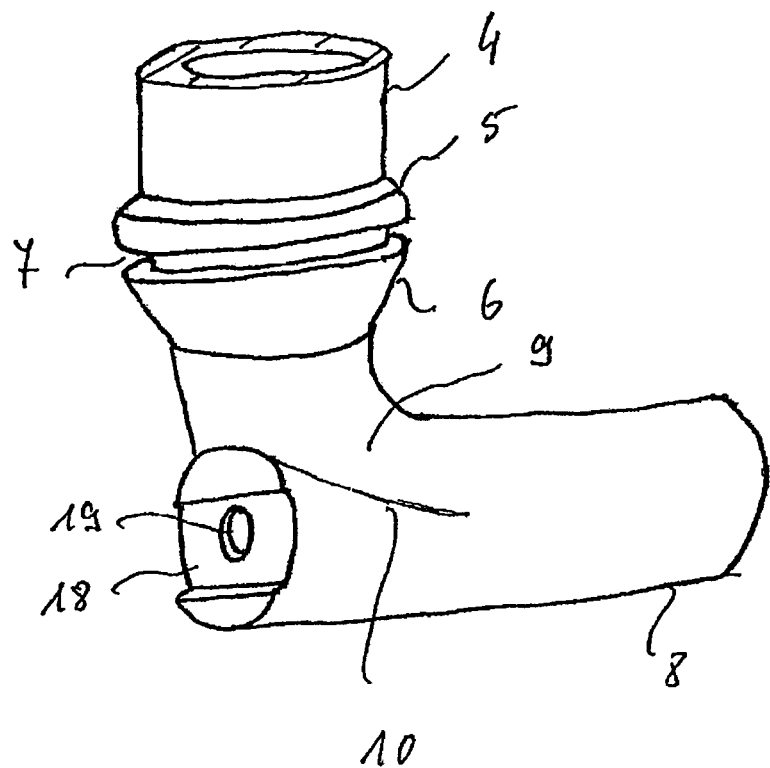
FIG. 5: an enlarged section of the teat rubber according to FIG. 1 in a perspective view.

FIG. 5 shows an enlarged section of the teat rubber 1 according to FIG. 1. FIG. 5 does not show the element 11. The curved section 9 has on its outer side of the wall 10 a recess 18, into which the base body 13 of the element 11 can be introduced. The extension 14 of the flow element 11 extends through a passage opening 19. The distance between the collar 17 and the base body 13 is preferably chosen in such a way that a positive or non-positive locking joint is produced with the edge of the passage opening 19 when the extension 14 extends through the passage opening 19. Sealing between the flow element 11 and the passage opening 19 is achieved with the sealing element 20, which is preferably designed in the form of a sealing lip.

The invention claimed is:

1. A teat rubber comprising:
   a shaft;
   a curved section joined to the shaft;
   a milk tube joined to the curved section to define a milk flow path with the shaft and curved section; and
   a channel disposed in the curved section and through which air flows toward the milk tube.

2. The teat rubber of claim 1, wherein the channel is arranged so that a direction of air flow through the channel is substantially parallel to a direction of milk flow.

3. The teat rubber of claim 1, wherein the shaft, curved section, and the milk tube are made in one piece.

4. A teat rubber comprising:
   a shaft;
   a curved section joined to the shaft;
   a milk tube joined to the curved section to define a milk flow path with the shaft and curved section;
   a channel joined to the curved section and through which air flows toward the milk tube; and
   a flow element disposed in the channel, and extending at least partly through a passage opening in the curved section.

5. The teat rubber of claim 4, and further comprising:
   a seal disposed adjacent to the passage opening.

6. The teat rubber of claim 4, wherein the flow element is releasably joined to the curved section.

7. The teat rubber of claim 4, wherein the flow element and the shaft is produced by a multi-component injection method.

8. The teat rubber of claim 4, wherein the flow element comprises:
   a base body; and
   a tubular extension joined to the base body, and arranged substantially coaxially with the channel.

9. The teat rubber of claim 8, wherein the tubular extension defines a slit extending in an axial direction of the tubular extension.

10. The teat rubber of claim 8, and further comprising:
    a collar joined to the tubular extension, the collar defining an inlet.

11. The teat rubber of claim 8, wherein the curved section defines a recess that at least partially defines the base body.

12. The teat rubber of claim 11, wherein the base body and the recess are constructed asymmetrically relative to the curved section.

13. The teat rubber of claim 4, wherein the flow element is produced by a multi-component injection method.

14. A milker unit comprising:
    a milking cup sleeve; and a teat rubber comprising:
    a shaft disposed at least partially in the milking cup sleeve;
    a curved section joined to the shaft;
    a milk tube joined to the curved section to define with the shaft and curved section a milk flow path; and
    a channel extending between a supply of air and the milk flow path and the channel is defined by a wall of the curved section and substantially aligned with the milk tube.

15. The milker unit of claim 14, wherein a channel is arranged so that the direction of air flow through the channel is substantially parallel to a direction of milk flow through the milk flow path.

* * * * *